G. E. THOMPSON.
DIRIGIBLE HEADLIGHT FOR AUTOMOBILES.
APPLICATION FILED MAR. 3, 1917.
1,257,767.
Patented Feb. 26, 1918.
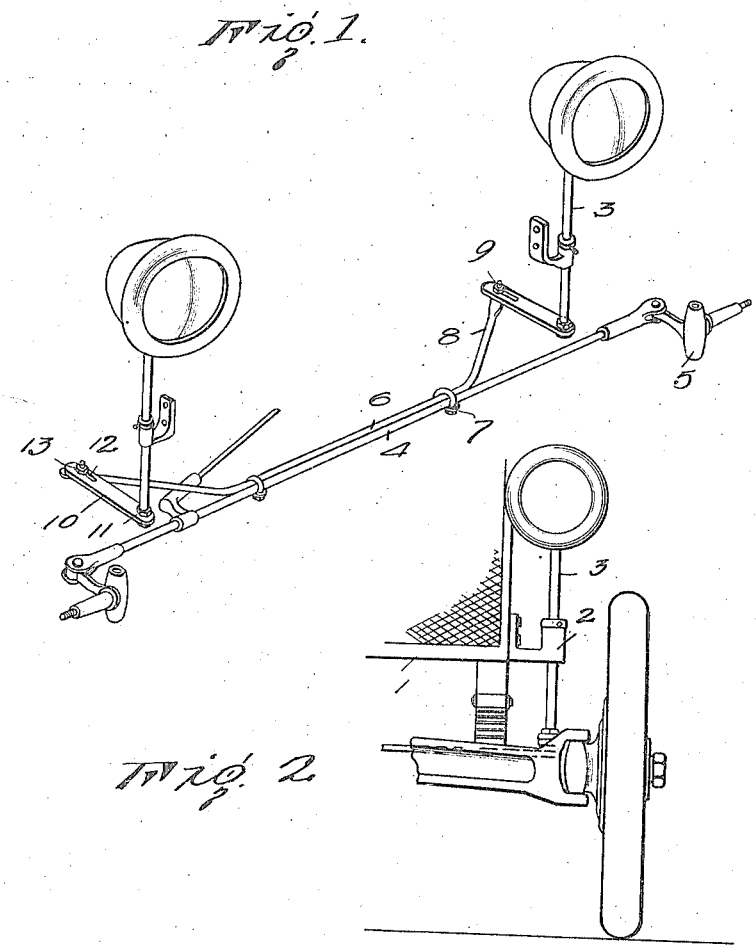
George F. Thompson
Inventor
By Geo. P. Kimmel.
Attorney

UNITED STATES PATENT OFFICE.

GEORGE E. THOMPSON, OF MANHATTAN, KANSAS.

DIRIGIBLE HEADLIGHT FOR AUTOMOBILES.

1,257,767.

Specification of Letters Patent. Patented Feb. 26, 1918.

Application filed March 3, 1917. Serial No. 152,357.

*To all whom it may concern:*

Be it known that I, GEORGE E. THOMPSON, a citizen of the United States, and resident of Manhattan, in the county of Riley and State of Kansas, have invented certain new and useful Improvements in Dirigible Headlights for Automobiles, of which the following is a specification.

This invention relates to new and useful improvements in vehicle headlights and relates more particularly to that class of lights known as dirigible lights, and the primary object of the invention is to provide a dirigible headlight for a motor vehicle which shall automatically adjust itself so as to always throw its rays directly in the path of the vehicle.

Another object of the invention is to provide an automatic headlight of this character which is so constructed that the same may be easily adjusted to fit various makes of vehicles and which may be quickly and easily applied in position.

A further object of the invention is to provide a device of this character which is easily and simply constructed, inexpensive to manufacture, and one which will be very efficient in operation.

With these and numerous other objects in view my invention consists of the novel features of construction, combination and arrangement of parts which will be hereinreferred to and more particularly pointed out in the specification and claim.

In the accompanying drawing:

Figure 1 is a perspective view of the dirigible headlight attachment, showing the same secured to the transverse steering rod of a vehicle, and Fig. 2 is a detail front elevation of a portion of an automobile showing the application of the dirigible headlight thereto.

In describing my invention I shall refer to the drawing in which similar reference characters designate corresponding parts throughout the several views. Referring more particularly to Fig. 2 the numeral 1 designates the body of the vehicle, that is provided adjacent one side thereof with a bracket 2, in which is mounted a vertically disposed lamp supporting holder 3. This lamp holder is adapted to rotate about a vertical axis, and said holder is of the conventional type such as is ordinarily used to hold lights of this character in position, having its upper end forked to support the light on opposite sides thereof, while its lower portion is a vertically disposed shank that is positioned through the bracket 2.

This construction and arrangement is duplicated on the opposite side of the front of a vehicle and the two light holders or brackets are connected by the steering device, so as to operate simultaneously.

The numeral 4 designates the transverse steering rod such as motor vehicles are provided with, adjacent the front axle, and said rod has its opposite end connected to spindles 5 of the conventional type of steering mechanism. Secured to the transverse steering rod 4 is a substantially U-shaped member 6, which has its base portion fastened thereto by clips 7, and its arms 8 projecting rearwardly and upwardly from said rod. The free ends of the arms 8 are provided with upwardly projecting pins 9, which have their upper ends externally threaded for a purpose to be hereinafter more fully described.

The free ends of the arms 8 are connected to each light supporting bracket by means of metal straps 10, which have their front ends rigidly connected with said brackets by a pair of jam nuts 11, while the opposite ends of said straps have formed therein a longitudinally extending slot 12, that is adapted to receive the pins 9 of said arms. A nut 13 is provided on the ends of said pins to securely hold the pins in position in the slot.

The operation of my improved automatic headlight is as follows: When the vehicle is turned the motion is transmitted from the transverse rod 4 through the arms 8, and the straps 10 to the rotatably mounted lamp supporting brackets and hence the lamps will be caused to turn in the direction of the vehicle. This will always direct the rays in the path of the vehicle. The longitudinally extending slot 12 in the end of the straps 10 will allow a certain adjustment and amount of play between the free ends of the arms 8 and said straps, so that the device is adapted to be applied to various types of vehicles.

From the foregoing description of the construction and operation of my new and improved dirigible headlight for vehicles, the manner of applying the same to use and the operation thereof will be readily understood, and it will be seen that I have provided a simple and efficient means for carrying out the objects of this invention.

Having fully described my invention, what I claim as new, and desire to secure by Letters Patent, is:

The combination with a vehicle having rotatably mounted lamp supporting brackets and a transverse steering rod, of a substantially U-shaped member having its base extending parallel with and secured to said rod and a pair of arms projecting rearwardly therefrom, pins projecting upwardly from the free extremities of said arms, straps having one of their ends rigidly connected to the supporting brackets and extending rearwardly from the same, and said straps having longitudinally extending slots in their free ends adapted to receive the pins on the ends of the arms of the U-shaped member.

In testimony whereof, I affix my signature hereto.

GEORGE E. THOMPSON.